Patented Oct. 26, 1937

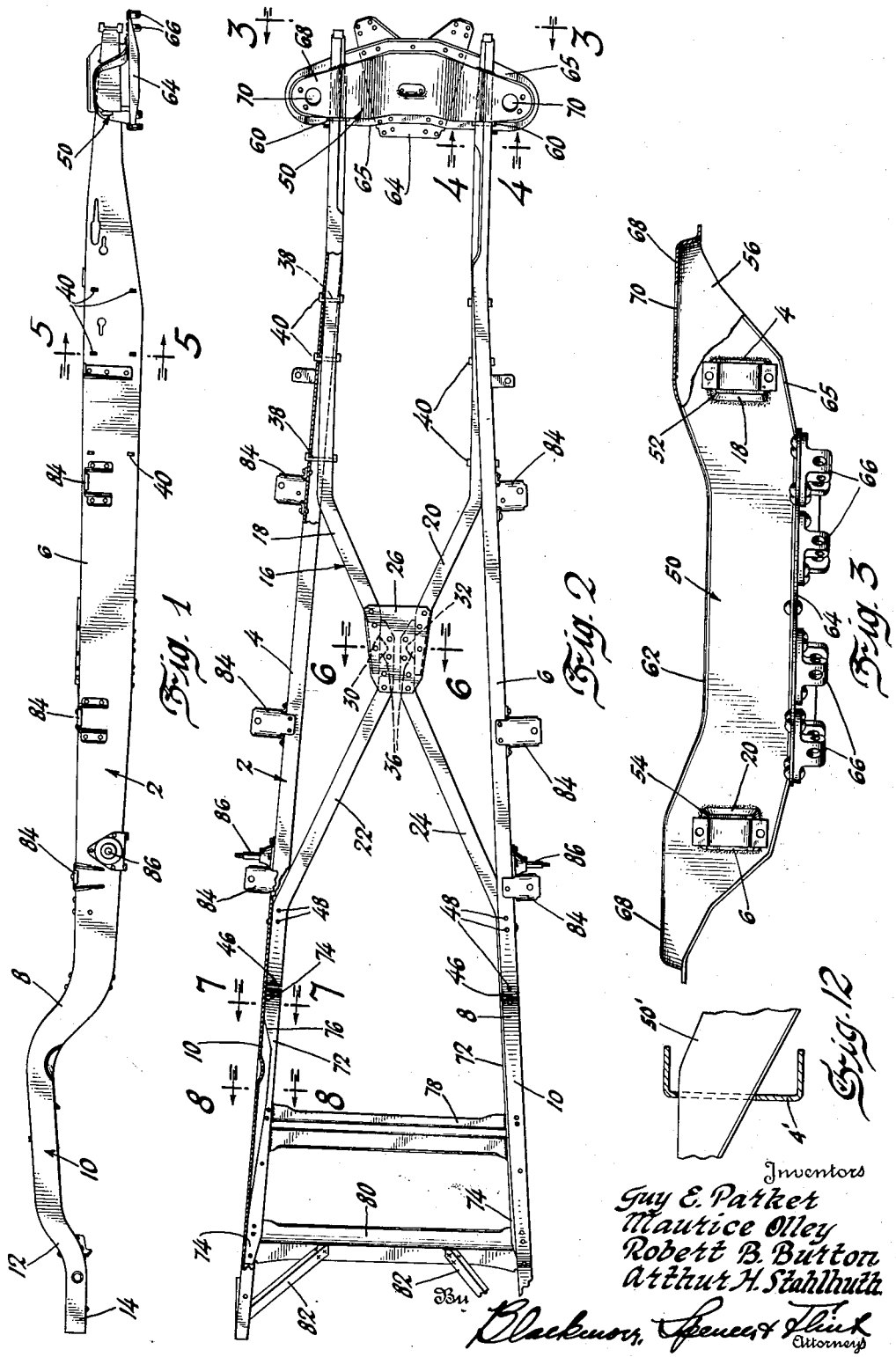

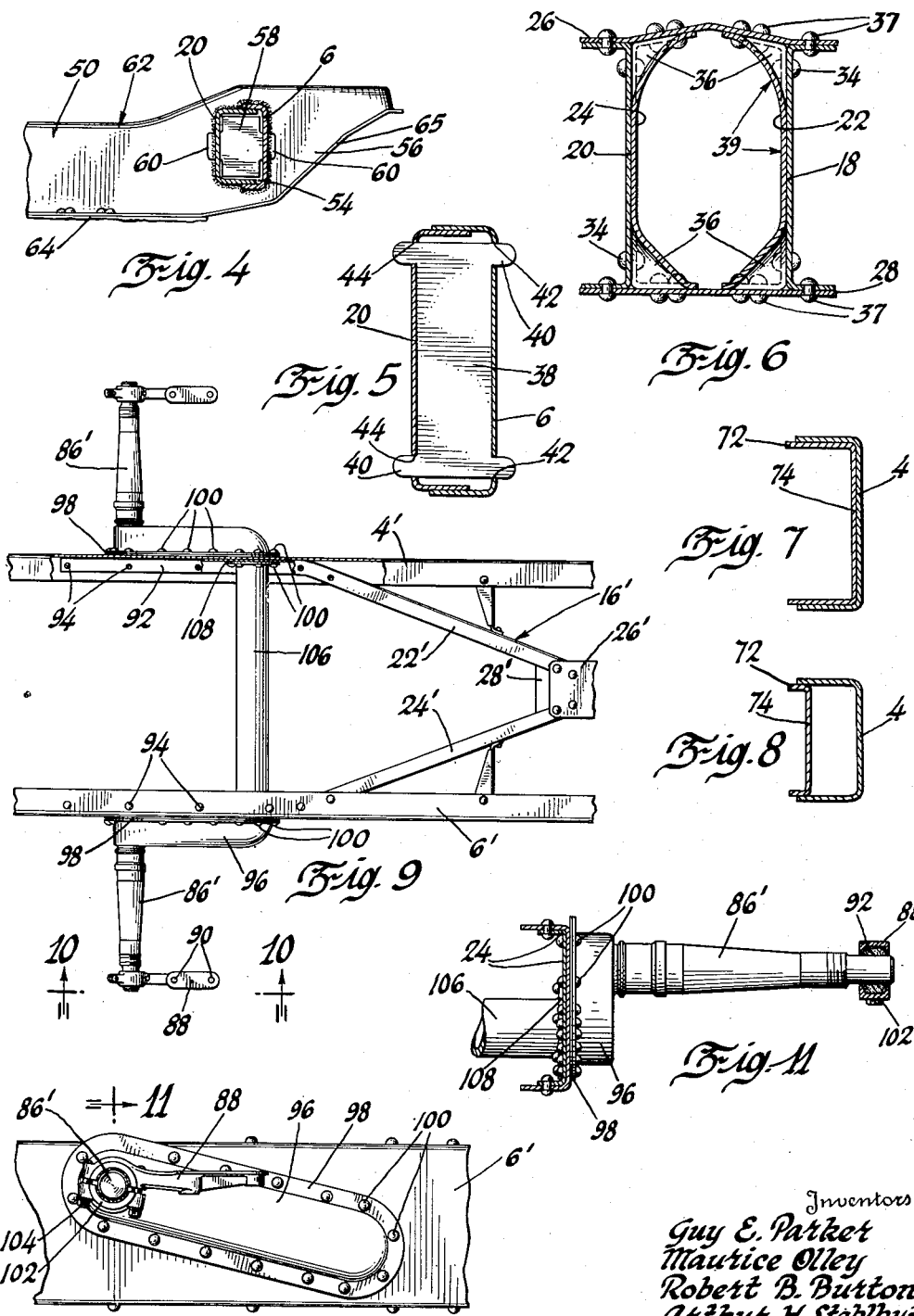

2,096,996

UNITED STATES PATENT OFFICE 2,096,996

CHASSIS

Guy E. Parker, Birmingham, and Maurice Olley, Robert B. Burton, and Arthur H. Stahlhuth, Detroit, Mich., assignors to General Motors Corporation, Detroit, Mich., a corporation of Delaware Application April 27, 1934, Serial No. 722,634

10 Claims. (Cl. 280—106)

This invention relates to a chassis or a frame used on automotive vehicles. The chassis or frame has particular reference to the type of frame used in connection with vehicles having independently sprung wheels.

The invention relates to a number of improvements in the details of the construction of the chassis and in the utilization of straight side bars at the front of the vehicle. With the side bars there is combined a transverse member through which the side bars extend, and which member overlaps the sides of the side bars to form pads to support the coil springs for the independently sprung wheels.

On the drawings:

Figure 1 is a side view of the chassis.

Figure 2 is the plan view with parts broken away and shown in section better to illustrate details of the invention.

Figure 3 is a front view of the chassis looking in the direction of the line 3—3 of Figure 2, with parts broken away and shown in section.

Figures 4 to 8 inclusive are sections of lines 4—4, 5—5, 6—6, 7—7, and 8—8 of Figures 1 and 2.

Figure 9 is a plan view of the rear portion of a modified form of a chassis with parts broken away better to illustrate the structure.

Figure 10 is a side view looking in the direction of the arrows 10—10 in Figure 9.

Figure 11 is a sectional view taken substantially on line 11—11 of Figures 9 and 10.

Figure 12 is a sectional view of a modification.

Referring to the drawings, the numeral 2 indicates the chassis as a whole, the chassis having the side bars 4 and 6. The side bars are subtantially straight for the greater part of their length but at the rear portions are bent upward at 8 to form the kick-up 10. The side bars are again downwardly bent at 12 so that the rear portion 14 is substantially in alignment with the straight portion at the front of the frame.

Between the side bars 4 and 6 at the center of the frame there is provided the X-shaped reinforcing member indicated as a whole at 16. The reinforcing X-shaped member 16 combines the forward elements 18 and 20 and the rear elements 22 and 24. The four elements 18, 20, 22 and 24 meet at the crossing point of the X and are secured together by the upper reinforcing plate 26 and lower reinforcing plate 28. The four elements of the X frame are channel shaped in cross section, the two forward members having the channels facing outwardly of the frame and the two rearward members 22 and 24 have the channels facing inwardly or toward each other. Accordingly, at the meeting point of the four elements the webs of elements 18 and 22 overlap or abut each other as shown at 30, or the webs of the elements likewise abut as shown at 32. The elements are secured together at the overlapping portions by the rivets 34.

To further strengthen the X member at the point of meeting, the forward and rearward elements 22 and 24 are bumped inwardly as indicated at 36 to give an oval shape 39 to the interior of the crossing of the X. This structure is best shown in Figure 6. The reinforcing plates 26 and 28 are secured to the flanges of the elements 18 and 24 inclusive by means of the rivets 37.

The forward members 18 and 20 of the X member 16 extend clear to the front end of the side bars 4 and 6 with the channels of the members 18 and 20 nested in the channels of the side bars 4 and 6. This structure is best shown in Figure 5 and gives to the structure at the front of the chassis a box section. Interiorly of the box sections are applied the reinforcing plates 38 which are of width equal to the space between the webs of the channels of the side bars and of the elements 18 and 20. The reinforcing plates 38 have four tongues 40 at their corners which project through openings 42 and 44 in the side bars and in the elements 18 and 20 and in their final form the tongues 40 are bent over and welded to the webs of the side bars 4 and 6, and of the elements 18 and 20. This structure gives an unusually rigid and unyielding chassis frame.

The rear members 22 and 24 do not extend to the end of the chassis frame but terminate at 46 which corresponds to the place at which the kick-up 10 starts. The ends of the elements 22 and 24 are riveted to the side bars as indicated by the rivets 48.

At the front end of the chassis frame there is applied the transverse bracing and reinforcing member indicated as a whole at 50. The bracing member 50 is U-shaped in cross section as is best seen in Figures 1 and 3. The side flanges 56 of the U are provided with openings 52 and 54 adjacent the ends of the bracing member to allow the passage therethrough of the side bars 4 and 6 and the front elements 18 and 20 of the X member 16. The forwardly extending portions of the chassis frame, therefore, pass through the transverse member 50 as is best seen in Figures 3 and 4.

Referring to Figure 4 it will be noted that interiorly of the box shaped section and immediately at the point where the side flanges 56 meet the box section there is applied a reinforcing plate having lateral ears 60 which extend through openings in the side bars 4 and 6 and in the forwardly extending elements 18 and 20 of the X member 16. These ears 60 are welded to the flange 56 to make a rigid construction. The size of the plate 58 is such as tightly to fit inside the box member. Four of these plates 58 are used, one at each place where the flanges 56 of the transverse member 50 meet the side bars 4 and 6.

The transverse member 50 is depressed between the side bars as indicated at 62 and on the depressed portion there may be mounted the forward supports for the engine, the radiator or any other suitable portion of the vehicle. On the under side of the transverse portion 50 below the depressed portion 62 there is secured the plate 64, the plate being riveted to the edge flanges 65 on the lower edge of the member 50. To the under side of the plate 64 there are attached the brackets 66 which serve to pivot the frames or wishbones (not shown) which support the stub axle for carrying the front wheels. A second arm or support is pivoted to the top of the chassis frame and supports the top portion of the stub axle.

As is best seen in Figures 3 and 4, the transverse member 50 extends beyond the sides of the chassis frame to form the pads 68 which serve as the upper abutment or support for the coil springs of the independently sprung wheels. The wishbone or support previously mentioned serves as the lower support for the coil springs. The pad 68 has openings 70 to allow for the positioning of the shock absorbers.

Referring now to the rear portion of the frame, particularly in Figure 2, it will be noted that the rear portion is reinforced by the channel bracing members 72 which extend from the ends 46 of the rear elements 22 and 24 to the end of the connecting hub 10. These elements 72 are channel shaped and at the place where they meet with the ends of the rear elements 22 and 24 their webs 74 abut the webs of the side members 4 and 6. The webs are bent inwardly of the chassis frame as indicated at 76 so that the box section, best indicated in Figure 8, is formed. This box section continues for the greater distance throughout the extent of the kick-up and at the rear of the kick-up the web 74 again abuts against the web of the side members 4 and 6. The member 72 is enclosed in a channel of the side members 4 and 6. The channel irons 72 and box section give an unusually rigid and unyielding construction that is to be preferred to an ordinary flat reinforcing plate.

The rear of the frame is also supported by the transverse braces 78 and 80 and between the brace 80 and the side member of the chassis frame the inclined braces 82 are used.

Attached to the webs of the chassis frame are the outwardly projecting brackets 84 on which the body is mounted. There are also attached to the side members 4 and 6 the studs 86, to each of which there is attached an arm or bracket 88 shown in Figure 10. This arm is secured to the body by bolts passing through the openings 90 in the flat portion of the arm. A rubber bushing 92 is positioned between the arm and stub shaft to deaden the sound. The purpose and function of this arm will be later described in connection with the modification shown in Figures 9 to 11 inclusive.

In Figures 9 to 11 inclusive the side bars are indicated at 4' and 6', the rear X reinforcing elements at 22' and 24', while 26' indicates the upper reinforcing plate, 28' the lower plate, and 16' the reinforcing X member. The rear portions 92 of the elements 22' and 24' are positioned inside the channels of the side bars and are riveted thereto as indicated at 94.

Extending outwardly from the side bars 4' and 6' are the studs 86'. The studs are rigidly secured to the semi-tubular members 96, rigidly secured by the flanges 98 and the rivets 100, to the side bars 4' and 6'. The studs or shafts project away from the chassis and have mounted on their ends the arms 88 which in turn are secured to the body. The arms 88 are secured to the ends of the studs 86 by means of the cap 102 and the bolts 104. The semi-tubular members 96 are secured to the chassis in an inclined position and serve rigidly to reinforce the chassis at the point there attached.

The brackets 88 extend forwardly of the trunnions 86' and are secured to the body by bolts passing through the openings 90. The purpose of these two connections is to take some of the drive or brake force directly from the trunnions to the body without first passing through the chassis as in conventional practice. Since about 40% of the mass of the car is in the body and sheet metal a direct connection of this sort greatly reduces the stress of the chassis.

Because it is proposed to assemble a transmission between the side bars and the space between the stub shafts 86 it is necessary to place the tubular transverse reinforcing member 106 a distance forward sufficient to accommodate the transmission. The ends of the tube 106 are flanged as indicated at 108 and are riveted to the side members 4' and 6', and to the elements 22' and 24' by means of the rivets 100.

Where a transmission is installed in the space between the trunnions 86' the transmission will additionally act as a reinforcing member for the frame.

Referring to the modification in Figure 12, a chassis side bar 4' is shown as having a web which is much wider than the side bars 4 and 6 in Figures 1 and 2. The transverse member 50', on the other hand, is much narrower at the place where it joins the side bars so that the transverse member passes through the side bars instead of the side bars passing through the transverse member as in Figures 1 and 3. The side bars 4' and transverse member 50' may be united in any suitable way such as by welding or the use of angle irons or plates, or they may be left unattached.

We claim:

1. In a chassis, side bars extending longitudinally the full length of the chassis, reinforcing members between and secured to both side bars, said members extending to one end of the chassis, and a cross member having the side bars and reinforcing members extended therethrough, said cross member projecting beyond the side bars of the chassis.

2. In a chassis, side bars extending longitudinally of the chassis, reinforcing members extending parallel with the side bars and forming therewith a box section, reinforcing elements in the box section, ears on said elements, said side bars and reinforcing members having openings for the reception of said ears, said ears projecting through said openings and secured to said side bars and reinforcing members.

3. In a chassis, side bars extending longitudinally of the chassis, an X-shaped reinforcing member between the side bars and connected thereto, said X member comprising two front and two rear channel elements, the rear elements having their channels facing in the direction opposite the channels in the front elements, the webs of said front elements overlapping and secured to the webs of the rear elements at the crossing point of the X, some of said elements having bumped-in portions where they overlap, and means at the crossing point of the X to reinforce the X member.

4. In a chassis, side bars extending longitudinally of the chassis, a reinforcing means securing the side bars together, said means extending to the end of the side bars and forming therewith a box section, and a channel shaped cross member at the end of the frame, said box section passing through the channel, said cross member having its ends extending beyond the sides of the chassis.

5. In a chassis, side bars extending longitudinally of the chassis, a reinforcing means securing the side bars together, said means extending to the end of the side bars and forming therewith a box section, and a channel shaped cross member at the end of the frame, said channel opening downwardly and said box section passing through the webs of said channel, said cross member having its ends extending beyond the sides of the chassis.

6. In a chassis, channel side bars extending longitudinally of the chassis, reinforcing means between the side bars and secured to both bars, said means having forwardly extending arms extending parallel with the side bars and secured thereto, and a transverse reinforcing means at the end of the chassis, said side bars and arms passing through the said transverse reinforcing means.

7. In a chassis, channel side bars extending longitudinally of the chassis, reinforcing means between the side bars and secured to both bars, said means having forwardly extending arms extending parallel with the side bars and secured thereto, and a transverse channel shaped reinforcing means at the end of the chassis, said side bars and arms passing through the webs of the channel of said reinforcing means.

8. In a chassis, side bars extending longitudinally of the chassis, a channel shaped cross member secured to the side bars and having the side bars extending therethrough, said cross member projecting beyond the sides of the side bars and having its channel opening downwardly, and means at the edge of said cross member to reinforce the same.

9. In a chassis, side bars extending longitudinally of the chassis, a channel shaped cross member having the side bars extending therethrough, said cross member projecting beyond the sides of the side bars and having its channel opening downwardly, means on the cross member to attach wheel suspension means, and means at the edge of said cross member to reinforce the same.

10. In a chassis, side bars extending longitudinally of the chassis, reinforcing members between and secured to both side bars, said members extending to one end of the chassis, a cross member having the side bars and reinforcing members extended therethrough, said cross member projecting beyond the side bars of the chassis, and means at the edge of said cross member to reinforce the same.

GUY E. PARKER.
MAURICE OLLEY.
ROBERT B. BURTON.
ARTHUR H. STAHLHUTH.